United States Patent [19]

Petersen

[11] 4,166,382

[45] Sep. 4, 1979

[54] AUTO ECONOMY GAUGE

[76] Inventor: Paul S. Petersen, 2200 Windsor Lake Dr., Minnetonka, Minn. 55343

[21] Appl. No.: 890,083

[22] Filed: Mar. 27, 1978

[51] Int. Cl.² ............................................. G01M 15/00
[52] U.S. Cl. ...................................................... 73/115
[58] Field of Search ............................ 73/115, 113, 114

[56] References Cited

U.S. PATENT DOCUMENTS

| 2,362,446 | 11/1944 | Bodine | 73/115 |
| 3,922,909 | 12/1975 | Dixson et al. | 73/115 |
| 3,937,202 | 2/1976 | Heath | 73/115 |
| 4,090,466 | 5/1978 | Jubinski | 73/115 |

Primary Examiner—Anthony V. Ciarlante
Attorney, Agent, or Firm—Nickolas E. Westman

[57] ABSTRACT

A system which aids the driver of an automobile in forming driving habits which result in better fuel economy includes apparatus for measuring the rate of absolute pressure change in the intake manifold of the automobile engine, together with a gauge or other visual display which provides the viewer a visual indication of the rate of change of intake manifold pressure. The gauge or display provides the driver with useful information as to the steadiness of his driving, and helps the driver to form the habit of smooth, gentle acceleration and deceleration.

4 Claims, 3 Drawing Figures

AUTO ECONOMY GAUGE

BACKGROUND OF THE INVENTION

The present invention relates to automobiles and other vehicles having internal combustion engines. In particular, the present invention is a system which aids the driver of the vehicle in developing more fuel efficient driving habits.

Increasing concern in recent years over the use of petroleum and other energy resources has led to extensive effort to increase the fuel economy of motor vehicles. Despite the efforts made to date, further efforts will be needed in the future to preserve existing energy resources.

For any particular automobile, the steady state fuel consumption at a given speed, load, wind, air pressure, etc, is essentially fixed by the road-load curve and the brake specific fuel consumption curve of the engine. In spite of this, it is well known that different drivers get different fuel economy with the same car under otherwise identical conditions. The prime reason for this difference in fuel economy is driving habits of the particular driver.

SUMMARY OF THE INVENTION

The present invention is a system which helps a driver to improve or maintain fuel-efficient driving habits. The invention includes means for measuring the rate of change of the intake manifold pressure of the engine and means for visually displaying an indication of the rate of change to the driver of the vehicle. This permits the driver to evaluate whether he is operating the vehicle in an economic manner and permits the driver to develop the habit of smooth, gentle acceleration and deceleration, with the resultant improvement in fuel economy.

DETAILED DESCRIPTION OF THE PREFERRED EMBODIMENTS

Figure 1:
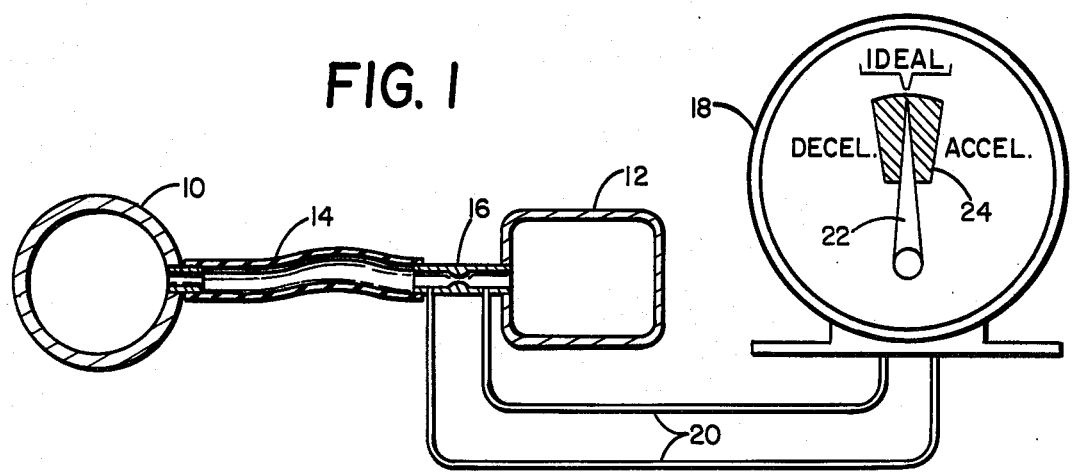
FIG. 1 is a schematic diagram of a preferred embodiment of the auto economy gauge of the present invention.

FIG. 1 is a schematic diagram of the present invention, in which the rate of change of pressure (dp/dt) within intake manifold 10 of an automobile engine (not shown) is monitored. In the preferred embodiment shown in FIG. 1, the determination of the rate of change in engine intake manifold pressure is achieved by closed volume chamber 12, which is connected to engine intake manifold 10 by tubing 14. A metering orifice 16 is provided in tube 14 between intake manifold 10 and volume chamber 12. A differential pressure gauge 18 derives pressure from either side of orifice 16 by small pressure lines 20. Differential pressure gauge 18 is visible to the driver and provides a reading of the rate of change of intake manifold pressure.

Under any steady state condition, needle 22 of pressure gauge 18 will be in a center or null position indicating zero dp/dt. For a given speed, this is the most favorable condition as far as fuel economy is concerned. If the driver is in the habit of "jabbing" at the accelerator, the needle will swing left and right (or up and down) rapidly, indicating poor driving technique.

If the driver opens and closes the throttle very smoothly, as required when speeding up and slowing down, or for hills, the needle or pointer 22 will move only slightly away from the null position because of the slower rate of change of pressure in intake manifold 10, as indicated by the pressure difference across metering orifice 16.

As shown in FIG. 1, gauge 18 includes a region 24 surrounding the null point which is painted a different color to indicate a band of operation which yields the best fuel economy. Deviations beyond this region 24 by needle 22 indicate an uneconomic mode of operation of the automobile engine. When needle 22 deviates to the left, rapid deceleration is occurring, while a deviation to the right indicates acceleration. In one embodiment, a light (not shown) is located at the null position. When needle 22 is at the null position, it covers the light, and when it deviates from the null position the light is uncovered, giving an additional indication to the driver that his driving is deviating from the ideal from a fuel economy standpoint.

Figure 2:
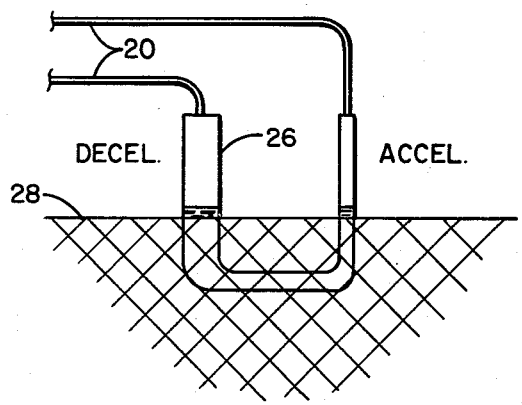
FIG. 2 is a front view of an alternative embodiment of the gauge viewed by the driver, using an unequal leg manometer.
Figure 3:
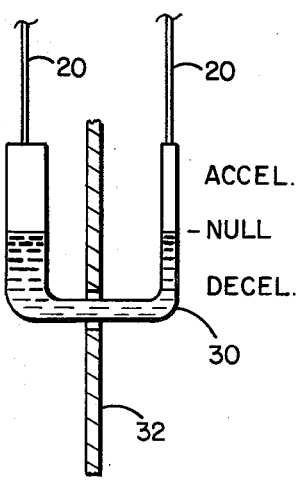
FIG. 3 is a side view of another alternative embodiment of the gauge using an unequal leg manometer.

FIGS. 2 and 3 show two alternative embodiments which use an unequal leg manometer to measure the differential pressure across orifice 16 and provide a visual indication to the driver of the rate of change of intake manifold pressure (dp/dt). As shown in FIG. 2, manometer 26 has most of its lower portion blocked from view of the driver by an opaque screen 28. The top edge of opaque screen 28 is preferably just below the level of the manometer liquid at the null position. Rapid acceleration causes the liquid to rise on the "acceleration" side of the manometer, while rapid deceleration causes a rise in manometer fluid on the "deceleration" side. By viewing the manometer, the driver receives a visual indication of the rate of change of pressure (dp/dt) in engine intake manifold 10.

In FIG. 3, a side view of another manometer 30 is shown. In this embodiment, opaque shield 32 shields half of manometer 30 so that the driver can view only one leg. Marks are provided nearby the visible leg of manometer 30 to indicate the null position and the acceleration and deceleration directions of the manometer fluid. Rapid acceleration causes a rise in the manometer liquid level in the visible leg, while rapid deceleration causes a fall in the manometer liquid level in the visible leg.

The present invention is based upon the recognition that fluctuating intake manifold pressure causes a reduction in fuel economy. By providing the driver a visual indication of the rate of change of intake manifold pressure, the present invention provides the operator with useful information from which he can improve his driving habits to achieve greater fuel economy. The reason why fluctuating intake manifold pressure reduces fuel economy is as follows.

Changes in intake manifold pressure cause periods of non-ideal use of fuel. This is especially true of rapid changes in intake manifold pressure. In a carburetor-type engine, the intake manifold is full of a mixture of air, vaporized fuel, and fuel droplets, all making their way to the valves of the engine and into the cylinder. Under steady state conditions, the fuel supply system supplies approximately the necessary fuel-air ratio to various cylinders.

When the throttle is suddenly opened, additional air is almost instantaneously available at all cylinder ports, but the fuel is not as quickly available. Part of the reason is that the droplets of liquid fuel lag behind the air and the vaporized fuel. In addition, there is a momentary reduction of vaporization caused by the increased air pressure. For these reasons, all carburetors require that the accelerator pump spray in a burst of extra fuel to prevent misfiring during acceleration. The extra fuel sprayed in during acceleration is essentially wasted since it will be followed by an over-rich mixture as the system comes back to equilibrium.

During quick deceleration, fuel flashes to vapor from the droplets due to the reduction in intake manifold pressure, resulting temporarily in a wastefully rich mixture. Commonly the mixture goes so rich that it won't burn, producing the characteristic puff of white smoke at the exhaust.

It can be seen, therefore, that rapid acceleration and deceleration can reduce fuel economy. The present invention is a positive indication to the driver whether he is operating the vehicle in a fuel efficient manner with respect to acceleration and deceleration. With the present invention, improvements in fuel economy can range from near zero for a driver who already pays strict attention to steady driving to as much as about 10% to 15% for a driver who has very jerky and aggressive driving habits.

In conclusion, the present invention is an effective, yet inexpensive system for aiding drivers in improving their driving habits. Other means, of course, could be used to measure dp/dt and to display it to the driver as taught by the present invention. The volume chamber, orifice, and differential pressure gauge configuration which has been specifically described, however, is particularly advantageous since it is low cost and involves a minimum amount of additional hardware and connections. For example, installation of tubing 14 can be achieved by a "T" connection to one of the existing lines running to the intake manifold. Alternatively, the small tube may be squeezed under the throttle gasket to provide a line from intake manifold 10.

Although the present invention has been described with reference to preferred embodiments, workers skilled in the art will recognize that changes may be made in form and detail without departing from the spirit and scope of the invention.

What is claimed is:

1. For use in vehicles having an internal combustion engine with an intake manifold, a system for permitting a driver of the vehicle to evaluate whether he is operating the vehicle in a fuel-efficient manner, the system comprising:
   means forming an independent undivided closed volume chamber separate from the intake manifold;
   means connecting the closed volume chamber and the intake manifold to permit fluid flow between the closed volume chamber and intake manifold including:
      a fixed orifice to meter fluid flow between the closed volume chamber and the intake manifold, said closed volume chamber being open to said intake manifold only through said orifice;
   differential pressure detecting means for detecting differential pressures across the fixed orifice; and
   display means for visually displaying a direct indication of the differential pressure detected across said fixed orifice.

2. The system of claim 1 wherein the differential pressure measuring means and the display means comprise a differential pressure gauge.

3. The system of claim 2 wherein the differential pressure gauge includes a dial and a pointer and wherein the dial has a region thereon which indicates a band of operation which yields best fuel economy.

4. The system of claim 1 wherein the differential pressure measuring means and the display means comprise a manometer.

* * * * *